United States Patent
Zhang et al.

(10) Patent No.: US 10,892,644 B2
(45) Date of Patent: Jan. 12, 2021

(54) SYSTEM FOR SUPPLYING ELECTRIC POWER TO TWO-DIMENSIONAL COMMUNICATION SHEET, AND FEEDING PORT

(71) Applicant: NATIONAL INSTITUTE OF INFORMATION AND COMMUNICATIONS TECHNOLOGY, Koganei (JP)

(72) Inventors: Bing Zhang, Tokyo (JP); Takashi Matsuda, Tokyo (JP); Toshinori Kagawa, Tokyo (JP); Ryu Miura, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 229 days.

(21) Appl. No.: 16/075,736

(22) PCT Filed: Aug. 6, 2017

(86) PCT No.: PCT/JP2017/004155
§ 371 (c)(1),
(2) Date: Aug. 6, 2018

(87) PCT Pub. No.: WO2017/138474
PCT Pub. Date: Aug. 17, 2017

(65) Prior Publication Data
US 2019/0044379 A1    Feb. 7, 2019

(30) Foreign Application Priority Data
Feb. 12, 2016    (JP) .................. 2016-024382

(51) Int. Cl.
*H02J 50/05*    (2016.01)
*H02J 50/10*    (2016.01)
(Continued)

(52) U.S. Cl.
CPC .............. *H02J 50/05* (2016.02); *H02J 50/10* (2016.02); *H02J 50/70* (2016.02); *H04B 13/00* (2013.01)

(58) Field of Classification Search
None
See application file for complete search history.

(56) References Cited

U.S. PATENT DOCUMENTS

2013/0293323 A1* 11/2013 Nakase ................... H01P 3/121
                                                          333/236
2015/0008994 A1    1/2015 Kobayashi et al.

FOREIGN PATENT DOCUMENTS

JP    2006229641 A    8/2006
JP    2011199350 A    10/2011
(Continued)

OTHER PUBLICATIONS

International Search Report (ISR) dated Feb. 28, 2017 issued in International Application No. PCT/JP2017/004155.
(Continued)

*Primary Examiner* — Jared Fureman
*Assistant Examiner* — Aqeel H Bukhari
(74) *Attorney, Agent, or Firm* — Holtz, Holtz & Volek PC (57) ABSTRACT

To provide a power supply system to a two-dimensional communication sheet that can prevent generation of leakage power without lowering a power efficiency, there are included a two-dimensional communication sheet 1 that has an dielectric layer 11, a first conductor layer 12 covering a rear surface of the dielectric layer 11, and a second conductor layer 13 covering a front surface of the dielectric layer 11
(Continued)

and composed of a mesh-shaped wiring pattern; and a power supply port 16 for supplying power to the two-dimensional communication sheet 1, the power supply port 16 having a first power supply plate 163 provided separately at a rear side of the first conductor layer 12, a second power supply plate 164 provided at a position opposite to the first power supply plate 163 separately at a front side of the second conductor layer 13, a first power supply body 161 electrically connected with the first power supply plate 163, and a second power supply body 162 electrically connected with the second power supply plate 164.

4 Claims, 4 Drawing Sheets

(51) Int. Cl.
*H02J 50/70* (2016.01)
*H04B 13/00* (2006.01)

(56) References Cited

FOREIGN PATENT DOCUMENTS

| | | |
|---|---|---|
| JP | 2013206892 A | 10/2013 |
| JP | 2014135600 A | 7/2014 |
| JP | 2015201895 A | 11/2015 |
| WO | 2013186967 A1 | 12/2013 |

OTHER PUBLICATIONS

Kenshi Horibata, et al., "Studies of Feeding Method and Layer Construction for Two-Dimensional Communication," Proceedings of the 2016 Ieice General Conference, Mar. 1, 2016, p. 679.
Nlaoshi Yamahira, et al., "Proximity Connection in Two-Dimensional Signal Transmission," Sice-Icase International Joint Conference, Busan, Korea, Oct. 18-21, 2006.
Nritten Opinion dated Feb. 28, 2017 issued in International Application No. PCT/JP2017/004155.
Extended European Search Report (Eesr) dated Jul. 18, 2019 issued in European Application No. 17750197.0.

\* cited by examiner

SYSTEM FOR SUPPLYING ELECTRIC POWER TO TWO-DIMENSIONAL COMMUNICATION SHEET, AND FEEDING PORT

TECHNICAL FIELD

The present invention relates to a power supply system to a two-dimensional communication sheet that enables transmission and reception of signals in the vicinity of a sheet surface and a power supply port.

BACKGROUND ART

There is proposed a sheet-like signal transmission device (two-dimensional communication sheet) in which front and rear surfaces of a sheet-like insulator are sandwiched between two conductor layers to enable transmission of an electromagnetic field between the conductor layers, and one of the sheet-like conductors is formed into a mesh to enable transmission and reception of signals and supply of power between communication devices placed at different positions on a sheet via an evanescent field that oozes out in the vicinity of the mesh (for example, refer to Non Patent Literature 1).

The two-dimensional communication sheet holds signals within the two-dimensional communication sheet and enables communication using the signals transmitted through the sheet surface via the evanescent field that oozes out on the front surface. That is, information can be transmitted with a two-dimensional "surface" of the communication sheet surface, and simple connection and communication with a small information leakage risk are enabled.

Here, there is proposed a low-dielectric sheet that contains, as a material of the dielectric layer of the two-dimensional communication sheet, 1-20 pts wt. of at least one aliphatic compound selected from an aliphatic acid, a fatty acid amide, and a fatty acid metal soap, to 100 pts wt. of a resin component, the aliphatic compound having a density of 0.02 to 0.1 g/cm3 and a dielectric constant of 1.2 or less and containing an air bubble having an average cell diameter of 1 to 300 µm, for improving a shape recovery property by making an air bubble hard to be collapsed (for example, refer to Patent Literature 1).

In addition, there is proposed a high-frequency substrate material for a two-dimensional communication sheet which includes at least a conductor layer and a resin foam layer and in which the resin foam layer has characteristics that a relative permittivity is 3 or less and a dielectric tangent is 0.01 or less at 12 GHz, the conductor layer and the resin foam layer are joined via a sealant A layer, and an adhesion strength between the conductor layer and the resin foam layer is 0.05 kN/m or more (for example, refer to Patent Literature 2).

CITATION LIST

Patent Literature

Patent Literature 1: JP 2015-201895 A
Patent Literature 2: JP 2013-206892 A

Non Patent Literature

Non Patent Literature 1: Naoshi Yamahira, Yastoshi Makino, Hiroto Itai, and HiroyukiShinoda, "Proximity Connection in Two-Dimensional Signal Transmission, "SICE-ICASE International Joint Conference, Busan, Korea, Oct. 18-21, 2006.

SUMMARY OF INVENTION

Technical Problem

Figure 7:
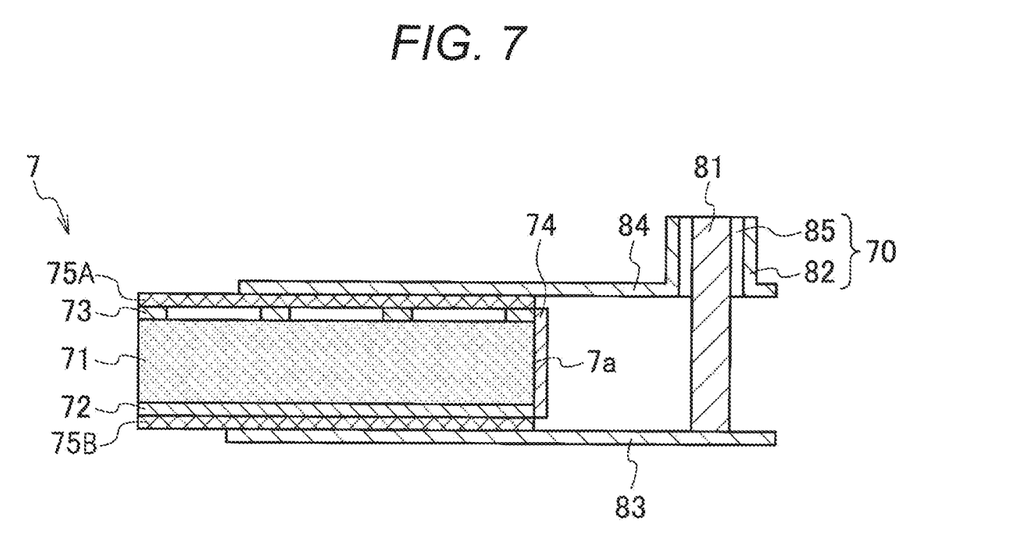
FIG. 7 is a diagram illustrating an example of a power supply port of a conventional clip-type input-output system.

In a conventional power supply method to a two-dimensional communication sheet, a so-called clip-type input-output system is adopted in many cases, that is, a power supply port 70 is attached to a side surface 7a of a two-dimensional communication sheet 7 as shown in FIG. 7 and power supply is performed. The two-dimensional communication sheet 7 includes a dielectric layer 71, a first conductor layer 72 that covers a rear surface of the dielectric layer 71, a second conductor layer 73 that covers a front surface of the dielectric layer 11 and is composed of a mesh-shaped wiring pattern, and a third conductor layer 74 that covers a side surface 7a of the dielectric layer 71. The two-dimensional communication sheet 7 also includes protective sheets 75A and 75B that cover the first conductor layer 72 and the second conductor layer 73, respectively. The protective sheets 75A and 75B are configured to be sandwiched by two rectangular power supply plates 83, 84, respectively. In this case, the power supply port 70 includes a first power supply plate 83 of a rectangular shape provided on an end surface of a protective sheet 75A, a second power supply plate 84 of a rectangular shape provided on an end surface of a second protective sheet 75B, a first power supply body 81 of a columnar shape electrically connected with the first power supply plate 83, and a second power supply body 82 of a columnar shape electrically connected with the second power supply plate 84. Note that, an insulator 85 may be sandwiched between the first power supply body 81 and the second power supply body 82.

In addition, in the conventional power supply method to a two-dimensional communication sheet, other than the clip-type input-output system, there has been a case where a coupler is arranged on the surface of the two-dimensional communication sheet, and power supply is performed by supply of an electromagnetic wave from the coupler to a sheet medium.

However, according to the above clip-type input-output system, although the power efficiency can be improved, there is a problem that an amount of generated leakage power is large. Further, with the power supply system by the coupler, there is a problem that the power efficiency cannot be improved.

The present invention has been made in view of such a circumstance and aims at providing a power supply system to a two-dimensional communication sheet capable of preventing generation of leakage power without lowering a power efficiency and a power supply port.

Solution to Problem

A two-dimensional communication sheet according to the present invention includes the two-dimensional communication sheet that has an dielectric layer, a first conductor layer covering a rear surface of the dielectric layer, and a second conductor layer covering a front surface of the dielectric layer and composed of a mesh-shaped wiring pattern; and a power supply port for supplying power to the two-dimensional communication sheet, the power supply port having a first power supply plate provided separately at a rear side of the first conductor layer, a second power supply plate provided at a position opposite to the first power supply plate separately at a front side of the second conductor layer, a first power supply body electrically connected with the first power supply plate, and a second power supply body electrically connected with the second power supply plate.

According to the above configuration, the first and second power supply plates are arranged so as to sandwich the two-dimensional communication sheet, and power is supplied to the first power supply plate by the first power supply body. That is, with the above configuration, the power supply port is directly provided on the two-dimensional communication sheet, and thus leakage of electromagnetic wave from the power supply part can be suppressed. Further, an oozing amount of the evanescent field on the two-dimensional communication sheet surface is improved.

In the two-dimensional communication sheet according to the present invention, in addition to the above configuration, the first power supply body may be formed into a columnar shape protruding to the front side while passing through the dielectric layer, the second power supply body may be protruded to the front side to enclose the first power supply body from a circumference, and the first power supply body and the second power supply body may be configured to be connectable to a coaxial cable for power supply.

In the two-dimensional communication sheet according to the present invention, in addition to the above configuration, the first power supply body may be formed into a columnar shape protruding to the rear side while passing through the dielectric layer, the second power supply body may be protruded to the rear side to enclose the first power supply body from a circumference, and the first power supply body and the second power supply body may be configured to be connectable to a coaxial cable for power supply.

In the two-dimensional communication sheet according to the present invention, in addition to the above configuration, each of the first power supply plate and the second power supply plate may be a conductor formed into a disk shape.

In addition, in the two-dimensional communication sheet according to the present invention, in addition to the above configuration, one end part of the first power supply plate or the second power supply plate is short-circuited. According to the above configuration, since an impedance matching circuit is formed by short-circuiting one end part of the first power supply plate or the second power supply plate, the impedance matching between the power supply port and the two-dimensional communication sheet is improved and the power supply efficiency can be further improved.

A power supply port according to the present invention includes, in the power supply port for supplying power to a two-dimensional communication sheet that has an dielectric layer, a first conductor layer covering a rear surface of the dielectric layer, and a second conductor layer covering a front surface of the dielectric layer and composed of a mesh-shaped wiring pattern, a first power supply plate provided separately at a rear side of the first conductor layer; a second power supply plate provided at a position opposite to the first power supply plate separately at a front side of the second conductor layer; a first power supply body electrically connected with the first power supply plate; and a second power supply body electrically connected with the second power supply plate. According to the above configuration, the first and second power supply plates are arranged so as to sandwich the two-dimensional communication sheet, and power is supplied to the first power supply plate by the first power supply body. That is, with the above configuration, the power supply port is directly provided on the two-dimensional communication sheet, and thus leakage of electromagnetic wave from the power supply part can be suppressed. Further, an oozing amount of the evanescent field on the two-dimensional communication sheet surface is improved.

Advantageous Effects of Invention

According to the present invention, the first and second power supply plates are arranged so as to sandwich the two-dimensional communication sheet, and power is supplied to the first power supply plate by the first power supply body that passes through the dielectric layer. That is, with the above configuration, the power supply port is directly provided on the two-dimensional communication sheet, and thus leakage of electromagnetic wave from the power supply part can be suppressed. Further, an oozing amount of the evanescent field on the two-dimensional communication sheet surface is improved, and also the input-output efficiency can be improved.

DESCRIPTION OF EMBODIMENTS

Embodiment

Figure 1:
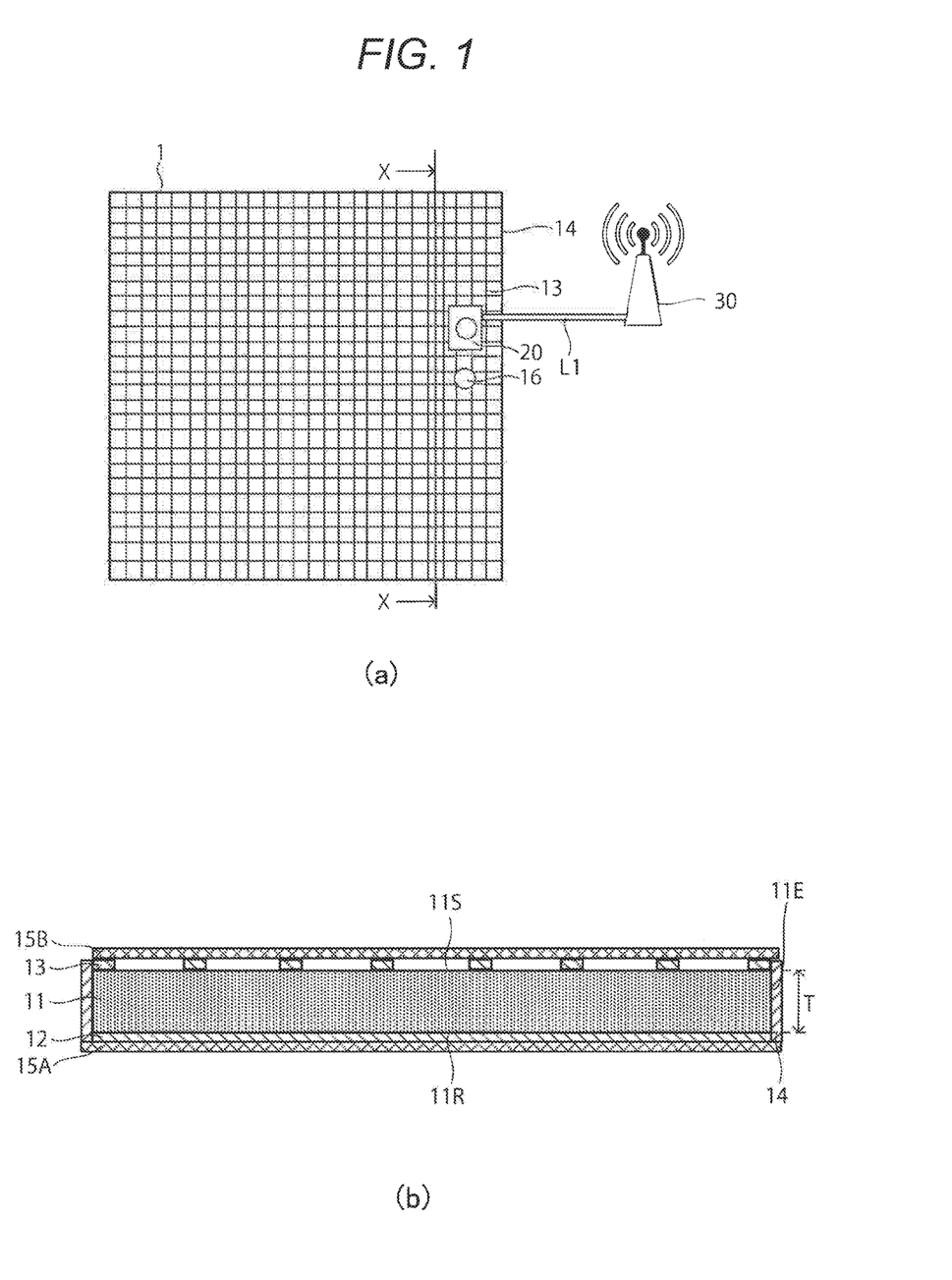
FIG. 1 is a configuration diagram of a two-dimensional communication sheet according to an embodiment.

FIG. 1 is a configuration diagram of a two-dimensional communication sheet 1 according to an embodiment. FIG. 1(a) is a plan view of a two-dimensional communication sheet 1, and FIG. 1(b) is an enlarged cross-sectional view in a line segment X-X of FIG. 1(a). As shown in FIG. 1(a) and FIG. 1(b), the two-dimensional communication sheet 1 includes a dielectric layer 11, a first conductor layer 12 that covers a rear surface 11R of the dielectric layer 11, a protective sheet 15A that covers the first conductor layer 12, a second conductor layer 13 that covers a front surface 11S of the dielectric layer 11 and is composed of a mesh-shaped wiring pattern, a third conductor layer 14 that covers an end part 11E of the dielectric layer 11, a protective sheet 15B that covers the second conductor layer 13, and a power supply port 16.

The dielectric layer 11 is composed of foamed polyethylene (dielectric constant of 2.3), and its thickness T is preferably 4 mm or more and 6 mm or less and more preferably set to about 5 mm. Here, the thickness (about 5 mm) of the dielectric layer 11 in this embodiment is a preferable thickness for improving the input-output efficiency especially in a 2.45 GHz band. Note that, a material of the dielectric layer 11 is not limited to polyethylene, but may be a dielectric. In addition, due to a quality of material of the dielectric layer 11, that is, a dielectric constant of the dielectric layer 11, a preferable thickness of the dielectric layer 11 also changes.

The first conductor layer 12 is formed of a good conductor, for example, such as copper or aluminum, and is a film-like conductor layer having a thickness of about 0.1 mm covering an entire rear surface 11R of the dielectric layer 11. Note that, any good conductor is not limited to copper or aluminum, but can be used as a material of the first conductor layer 12.

The second conductor layer 13 is formed of copper and is a conductor layer composed of a mesh-shaped wiring pattern having a thickness of about 0.1 mm covering an entire front surface 11H of the dielectric layer 11. Note that, the thickness of the second conductor layer 13 is about 0.5 mm.

Figure 2:
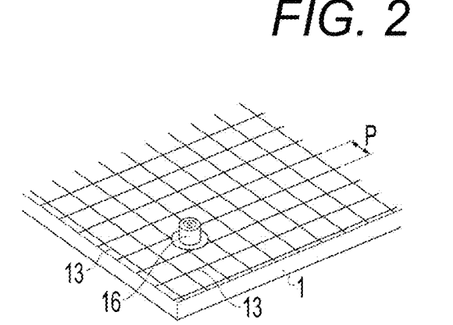
FIG. 2 is an enlarged cross-sectional view of a second conductor layer of the two-dimensional communication sheet according to an embodiment.

FIG. 2 is a partially enlarged view of the second conductor layer 13 of the two-dimensional communication sheet 1. As shown in FIG. 2, the wiring pattern constituting the second conductor layer 13 may be formed into a mesh shape, its line width is preferably 0.5 mm or more and 1.5 mm or less, and an arrangement pitch P of the mesh pattern is preferably about 8 mm. Note that, conditions of the line width and arrangement pitch of the second conductor layer 13 are preferable conditions (preferable conditions for making an impedance 50Ω) for improving the input-output efficiency especially in the 2.45 GHz band. Note that, any good conductor is not limited to copper or aluminum, but can be used as a material of the second conductor layer 13.

The third conductor layer 14 is formed of a good conductor, for example, such as copper or aluminum, and covers the end part 11E of the dielectric layer 11. The third conductor layer 14 short-circuits between the first conductor layer 12 and the second conductor layer 13 and prevents leakage of electromagnetic wave from the end part of the two-dimensional communication sheet 1. Note that, the third conductor layer 14 does not need to cover the entire end part 11E of the dielectric layer 11 and may prevent leakage of electromagnetic wave from the end part of the two-dimensional communication sheet 1. Hence, the third conductor layer 14 may be formed into a mesh or stripe to cover the end part 11E of the dielectric layer 11. In addition, any good conductor is not limited to copper or aluminum, but can be used as a material of the third conductor layer 14.

The protective sheets 15A and 15B are each a sheet formed of a dielectric, for example, such as polyethylene or polypropylene, and cover the surface of the first conductor layer 12 and the surface of the second conductor layer 13 to protect the first conductor layer 12 and the second conductor layer 13, respectively.

Figure 3:
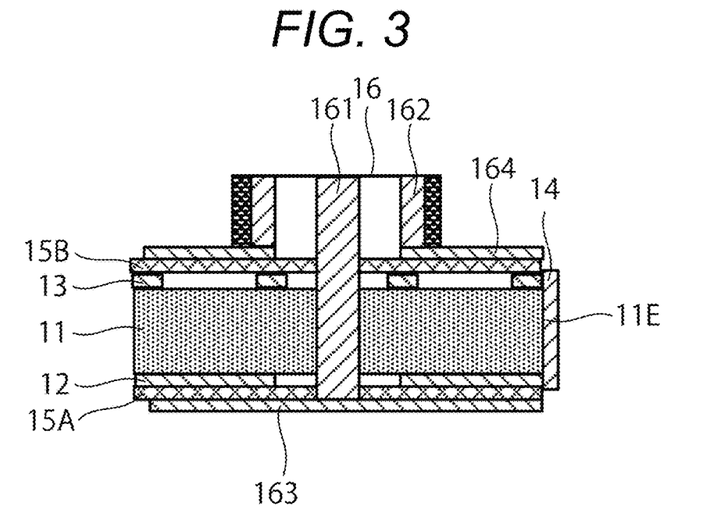
FIG. 3 is a configuration diagram of a power supply port of the two-dimensional communication sheet according to an embodiment.

FIG. 3 is a configuration diagram of the power supply port 16. The power supply port 16 is a port for supplying power to the two-dimensional communication sheet 1 and forms an inverted F antenna. As shown in FIG. 3, the power supply port 16 at least includes a first power supply body 161 of a columnar shape, a second power supply body 162 of a columnar shape, a first power supply plate 163, and a second power supply plate 164. The first power supply body 161 is formed of a good conductor, for example, such as copper or aluminum, and passes through the dielectric layer 11 to be electrically connected with the first power supply plate 163. In addition, the second power supply body 162 is formed of a good conductor, for example, such as copper or aluminum, and electrically connected with the second power supply plate 164. Here, in FIG. 3, when an upper direction indicates the front side and a lower direction indicates the rear side, both of the first power supply body 161 and the second power supply body 162 are protruded toward the front side. The second power supply body 162 is formed to enclose the first power supply body 161 from the circumference.

The first power supply plate 163 is a circular conductor layer provided separately from the first protective sheet 15A surface, that is, the first conductor layer 12. In addition, the second power supply plate 164 is a disk-shaped conductor provided separately from the second protective sheet 15B surface, that is, the mesh-shaped second conductor layer 13. Each of the first power supply plate 163 and the second power supply plate 164 is formed of a good conductor, for example, such as copper or aluminum.

The power supply port 16, to which a coaxial cable is connected, for example, through a Sub-Miniature Type A (SMA) connector, is supplied with high-frequency power. That is, the coaxial cable is connected to the first power supply body 161 and the second power supply body 162 which are protruded toward the front side. Since the power supply port 16 is capacitively coupled with the two-dimensional communication sheet 1 by the first power supply plate 163 and the second power supply plate 164, the high-frequency power supplied from the coaxial cable is transmitted to the two-dimensional communication sheet 1. As described above, since the power supply port 16 is the inverted F antenna, compact and high-efficiency power supply can be performed.

Figure 4:
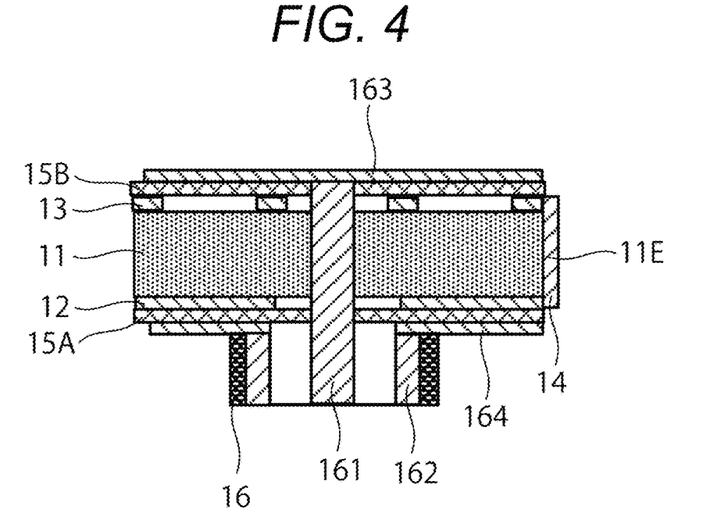
FIG. 4 is another configuration diagram of the power supply port of the two-dimensional communication sheet according to an embodiment.

Note that, as shown in another configuration diagram of FIG. 4, a connection port of the power supply port 16 with the coaxial cable may be provided on the rear surface side of the two-dimensional communication sheet 1. Here, in FIG. 4, when an upper direction indicates the front side and a lower direction indicates the rear side, both of the first power supply body 161 and the second power supply body 162 are protruded toward the rear side. The second power supply body 162 is formed to enclose the first power supply body 161 from the circumference. That is, the coaxial cable is connected to the first power supply body 161 and the second power supply body 162 which are protruded toward the rear side. In this case, the first power supply plate 163 is provided separately from the second protective sheet 15B surface, that is, the mesh-shaped second conductor layer 13, and the second power supply plate 164 is provided separately from the first protective sheet 15A surface, that is, the first conductor layer 12.

In addition, in the configuration shown in FIG. 3, the end part of the second power supply plate 164 may be short-circuited with the first conductor layer 12 to form an impedance matching circuit between the power supply port 16 and the two-dimensional communication sheet 1. In addition, in the configuration shown in FIG. 4, the end part of the first power supply plate 163 may be short-circuited with the first conductor layer 12 to form an impedance matching circuit between the power supply port 16 and the two-dimensional communication sheet 1. On this occasion, the end part of the second power supply plate 164 or the first power supply plate 163 may be short-circuited with the first conductor layer 12 via the third conductor layer 14. With such a configuration, the impedance matching between the power supply port 16 and the two-dimensional communication sheet 1 is further improved, and thus the power supply efficiency can be further improved.

Note that, the shapes of the first and second power supply bodies 161, 162 shown in FIGS. 3 to 4 are not limited to a columnar shape and can be formed into various shapes. In addition, the shapes of the first and second power supply plates 163, 164 shown in FIGS. 3 to 4 are not limited to a disk shape or a rectangular plate shape and can be formed into various shapes. The power supply port 16 of the inverted F antenna shown in FIGS. 3 and 4 can improve the power supply efficiency because the leakage of electromagnetic wave from the power supply part is small in comparison with the conventional power supply method of clip-type input-output system. In addition, the power supply port 16 of the inverted F antenna shown in FIGS. 3 and 4 has a smaller dependency of spread of the magnetic field generated from the power supply port 16 on the horizontal direction (X-direction) and the vertical direction (Y-direction) and allows uniform spread, and thus is excellent in power supply efficiency.

For actual use of the two-dimensional communication sheet 1, as shown in FIG. 1, a communication coupler 20 is used. The communication coupler 20 is connected with an access point 30 by a cable L1. The access point 30 is a device for relaying signals of a wireless LAN and enables a communication with another device outside the two-dimensional communication sheet 1 by connection of the communication coupler 20 to the access point 30. Here, the communication coupler 20 performs transmission and reception of signals with the access point 30 with output (power) about one thousandth of that of the wireless LAN. Note that, to reduce the information leakage risk, the access point 30 may be connected with another device outside the two-dimensional communication sheet 1 not by the wireless LAN but by the wired LAN.

Note that, the communication coupler 20 has an electric field type and a magnetic field type. An electric-field type coupler can be made more compact than a magnetic-field type coupler but is not preferable because an excited magnetic field leaks to surroundings of the communication coupler 20. Note that, even the magnetic-field type coupler can be made compact by adjustment of the mesh-shaped second conductor layer 13. Hence, in the present embodiment, the magnetic field type is preferably used as the communication coupler 20. However, if the power used in the two-dimensional communication sheet 1 is small, influence of the leakage of magnetic field is small, the electric-field type coupler is also useful, and thus even for the electric-field type coupler, its use shall not be excluded.

Figure 5:
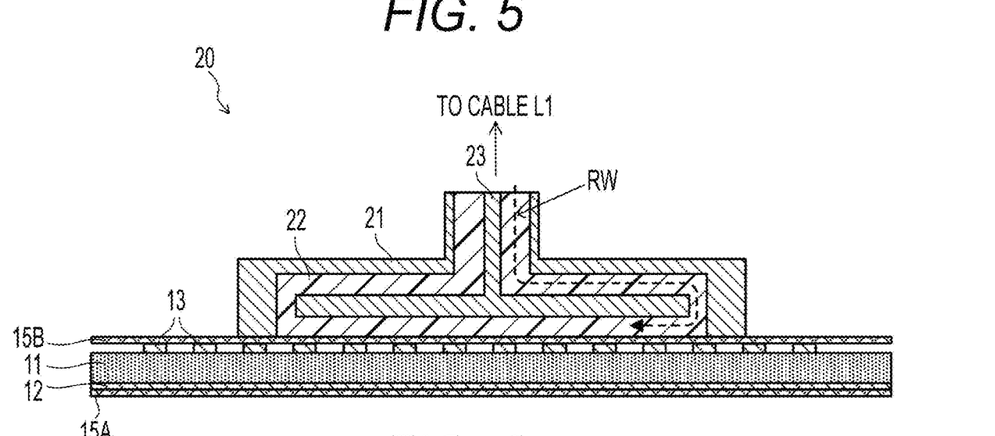
FIG. 5 is a configuration diagram of a communication coupler used in the two-dimensional communication sheet according to an embodiment.

Note that, FIG. 5 illustrates a general structure (cross section) of the communication coupler 20. The communication coupler 20 includes a case body 21 formed of, for example, a good conductor, such as copper or aluminum, a dielectric 22 filled in the case body 21, and a plate-like internal electrode 23 formed of, for example, a good conductor, such as copper or aluminum. The communication coupler 20 is connected with the cable L1 and the signal (indicated with a chain line of FIG. 5) is propagated with the electromagnetic wave RW confined in the dielectric 22 between the case body 21 and the internal electrode 23. Hence, signals can be transmitted and received to and from another device placed on the two-dimensional communication sheet 1 surface via the evanescent field oozed to the surface of the two-dimensional communication sheet 1. Note that, in this embodiment, a communication frequency with the communication coupler 20 is assumed to be 2.45 GHz.

Example

Next, an example will be described. The present inventors performed simulation of a magnetic field strength for the power supply port 16 of the above-described inverted F antenna type (Example below) and a power supply port of the conventional clip-type input-output system (Comparative Example below).

Simulation conditions are described in Table 1 below.

TABLE 1

|  | COMPARATIVE EXAMPLE | EXAMPLE |
| --- | --- | --- |
| SIMULATOR ANALYSIS METHOD | CST MW STUDIO 2015 TIME DOMAIN | CST MW STUDIO 2015 TIME DOMAIN |
| FREQUENCY | 2.45 GHz | 2.45 GHz |
| SHEET SIZE (HORIZONTAL × VERTICAL) | 300 mm × 210 mm | 300 mm × 210 mm |
| MESH SHAPE | NORMAL MESH | NORMAL MESH |
| SHEET (DIELECTRIC LAYER) THICKNESS | 2 mm | 2 mm |
| DIELECTRIC CONSTANT OF DIELECTRIC LAYER | 2.3 | 2.3 |
| PROTECTIVE LAYER THICKNESS | 0.25 mm (EACH AT TOP AND BOTTOM) | 0.25 mm (EACH AT TOP AND BOTTOM) |
| TERMINATION OF SIMULATION AREA | OPEN | OPEN |

Figure 6:
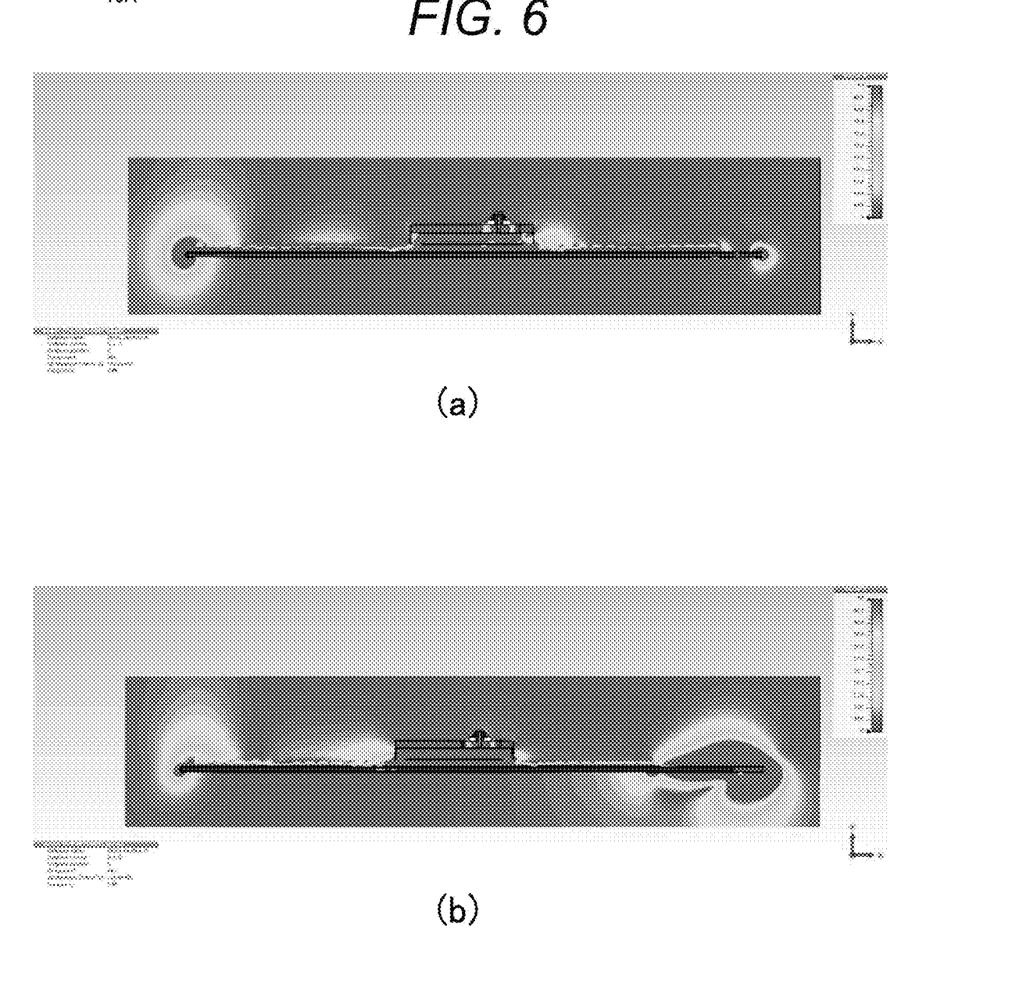
FIG. 6 is a diagram illustrating a simulation result of a magnetic field strength of the two-dimensional communication sheet according to an example.

Next, a simulation result is shown. FIG. 6(*b*) is a simulation result of the magnetic field strength for the power supply port of the clip-type input-output system according to Comparative Example. FIG. 6(*a*) is a simulation result of the magnetic field strength for the power supply port of the inverted F antenna type according to Example.

In Comparative Example of FIG. 6(*b*), a dark color area (area of strong magnetic field strength) expanded widely at a side end of the two-dimensional communication sheet. Hence, in Comparative Example, it is known that the leakage magnetic field became larger.

In comparison with Comparative Example of FIG. 6(*b*), in Example of FIG. 6(*a*), it is known that the dark color area (area of strong magnetic field strength) was suppressed narrowly at the side end of the two-dimensional communication sheet. That is, according to Example, it is known that the leakage magnetic field became smaller.

The wiring pattern of the conductor layer 13 of the two-dimensional communication sheet 1 according to the embodiment has the line width of 0.5 mm or more and 1.5 mm or less and the mesh pattern arrangement pith P of 8 mm. Hence, the impedance matching with the communication coupler 20 can be further improved. Thus, the input-output efficiency of electromagnetic wave (especially in 2.45 GHz band) can be further improved. Further, the uniformity of the evanescent field on the two-dimensional communication sheet surface is further improved. Further, the oozing amount of the evanescent field on the two-dimensional communication sheet surface is further improved and a communication performance is improved.

In addition, the dielectric layer 11 of the two-dimensional communication sheet 1 according to the embodiment has the thickness of 4 mm or more and 6 mm or less and more preferably about 5 mm. Hence, the impedance matching with the communication coupler 20 can be further improved. Thus, the input-output efficiency of electromagnetic wave (especially in 2.45 GHz band) can be further improved.

In addition, the two-dimensional communication sheet 1 according to the embodiment covers the end part 11E of the dielectric layer 11 and includes the third conductor layer 14 that short-circuits the first conductor layer 12 and the second conductor layer 13. Hence, the leakage of electromagnetic wave from the end part of the two-dimensional communication sheet 1 can be effectively suppressed. As a result, the evanescent field oozed to the two-dimensional communication sheet 1 surface is further improved.

In addition, the two-dimensional communication sheet 1 according to the embodiment has the first power supply plate 163 separately arranged on the first conductor layer 12, the second power supply plate 164 separately arranged on the second conductor layer 13, the first power supply body 161 passing through the dielectric layer 11 and electrically connected with the first power supply plate 163, and the second power supply body 162 electrically connected with the second power supply plate 164 and includes the power supply port 16 for supplying power to the two-dimensional communication sheet 1.

The first and second power supply plates 163, 164 are arranged so as to sandwich the two-dimensional communication sheet 1, and power is supplied to the first power supply plate 163 by the first power supply body 161 that passes through the dielectric layer 11. That is, with the above configuration, the power supply port 16 is directly provided on the two-dimensional communication sheet 1, and thus the leakage of electromagnetic wave from the power supply part can be suppressed. In addition, the oozing amount of the evanescent field on the two-dimensional communication sheet 1 surface is improved.

In addition, in the two-dimensional communication sheet 1 according to the embodiment, one end part of the first power supply plate 163 or the second power supply plate 164 is short-circuited. Hence, the impedance matching between the power supply port 16 and the two-dimensional communication sheet 1 is improved, and the power supply efficiency can be further improved.

Other Embodiments

Note that, the present invention is not limited to the above-described embodiment. That is, a person skilled in the art may perform various modifications, combinations, sub-combinations, and substitutions about components of the above-described embodiment within a technical scope of the present invention or its equal range. For example, in the above embodiment, only one power supply port 16 is provided but the power supply port 16 may be provided in plural numbers. In this case, if the power supply ports 16 are arranged along a diagonal line of the two-dimensional communication sheet 1, the uniformity of the evanescent field oozed to the two-dimensional communication sheet 1 surface is further improved.

In addition, according to the present invention, not limited to the case of being embodied as the two-dimensional communication sheet 1, it is obvious that the present invention may be configured with only the power supply port 16 for supplying power to the two-dimensional communication sheet 1.

REFERENCE SIGNS LIST

1 two-dimensional communication sheet
11 dielectric layer
12 first conductor layer
13 second conductor layer
14 third conductor layer
15A first protective sheet
15B second protective sheet
16 power supply port
161 first power supply body
162 second power supply body
163 first power supply plate
164 second power supply plate
20 communication coupler
21 case body
22 dielectric
23 internal electrode
30 access point

The invention claimed is:

1. A power supply system for a two-dimensional communication sheet, comprising:
   the two-dimensional communication sheet, which comprises a dielectric layer, a first conductor layer covering a first surface of the dielectric layer, and a second conductor layer covering a second surface of the dielectric layer and composed of a mesh-shaped wiring pattern; and
   a power supply port for supplying power to the two-dimensional communication sheet, the power supply port comprising a first power supply plate provided separately at a side of the first conductor layer, a second power supply plate provided at a position opposite to the first power supply plate and provided separately at a side of the second conductor layer, a first power supply body electrically connected with the first power supply plate, and a second power supply body electrically connected with the second power supply plate, wherein:
   the first power supply body has a columnar shape, passes through the dielectric layer, and protrudes from the two-dimensional communication sheet,
   the second power supply body protrudes from the two-dimensional communication sheet and encloses the first power supply body circumferentially, and
   the first power supply body and the second power supply body are configured to be connectable to a coaxial cable for power supply.

2. The power supply system to a two-dimensional communication sheet according to claim 1, wherein each of the first power supply plate and the second power supply plate is a conductor having a disk shape.

3. The power supply system to a two-dimensional communication sheet according to claim 2, wherein one end part of the first power supply plate or the second power supply plate is short-circuited.

4. The power supply system to a two-dimensional communication sheet according to claim 1, wherein one end part of the first power supply plate or the second power supply plate is short-circuited.

* * * * *